United States Patent
Ichinokawa

(10) Patent No.: US 10,338,230 B2
(45) Date of Patent: *Jul. 2, 2019

(54) MULTIPATH ERROR CORRECTION

(71) Applicant: Honda Motor Co., Ltd., Tokyo (JP)

(72) Inventor: Jumpei Ichinokawa, Rolling Hills Estates, CA (US)

(73) Assignee: Honda Motor Co., Ltd., Tokyo (JP)

( * ) Notice: Subject to any disclaimer, the term of this patent is extended or adjusted under 35 U.S.C. 154(b) by 134 days.

This patent is subject to a terminal disclaimer.

(21) Appl. No.: 15/598,355

(22) Filed: May 18, 2017

(65) Prior Publication Data

US 2017/0254902 A1    Sep. 7, 2017

Related U.S. Application Data

(63) Continuation of application No. 14/977,689, filed on Dec. 22, 2015, now Pat. No. 9,766,344.

(51) Int. Cl.

| G01S 19/22 | (2010.01) |
| G01C 21/26 | (2006.01) |
| G01S 19/45 | (2010.01) |
| G01S 19/48 | (2010.01) |
| G01C 21/36 | (2006.01) |
| G08G 1/16  | (2006.01) |

(52) U.S. Cl.
CPC .............. *G01S 19/22* (2013.01); *G01C 21/26* (2013.01); *G01S 19/45* (2013.01); *G01S 19/48* (2013.01); *G01C 21/3658* (2013.01); *G08G 1/167* (2013.01)

(58) Field of Classification Search
CPC .......... G01S 19/22; G01S 19/45; G01S 19/48; G01C 21/26; G01C 21/3658; G08G 1/167

USPC ........................................................ 701/468
See application file for complete search history.

(56) References Cited

U.S. PATENT DOCUMENTS

| 5,780,826 A | 7/1998 | Hareyama et al. |
| 5,926,117 A | 7/1999 | Gunji et al. |

(Continued)

FOREIGN PATENT DOCUMENTS

| JP | 11023291 A    | * | 1/1999 |
| JP | 2013072782 A  | * | 4/2013 |

(Continued)

OTHER PUBLICATIONS

Peng et al., "Map matching algorithm based on GPS/DR Integrated Positioning System," Year: 2010, vol. 1, pp. 131-135.*

(Continued)

*Primary Examiner* — Tuan C To
(74) *Attorney, Agent, or Firm* — Rankin, Hill & Clark LLP

(57) ABSTRACT

In one or more embodiments, techniques and systems for multipath error correction are provided herein. A global positioning system (GPS) component or unit determines a position of a vehicle at different times. When the vehicle enters a tunnel, for example, the GPS unit may not provide accurate readings. In this scenario, an image capture component or lane keeping assist system can monitor for a change of lane associated with the vehicle. An error correction component can calculate an updated position for the vehicle by using the change of lane information to confirm or correct the GPS position of the vehicle, such as when the vehicle is exiting the tunnel.

20 Claims, 5 Drawing Sheets

(56) References Cited

U.S. PATENT DOCUMENTS

| | | | |
|---|---|---|---|
| 8,467,956 B2* | 6/2013 | Lee | G01C 21/3658 |
| | | | 701/409 |
| 8,515,610 B2* | 8/2013 | Sung | G05D 1/0223 |
| | | | 701/23 |
| 8,600,673 B2* | 12/2013 | Nakamura | B60R 1/00 |
| | | | 701/23 |
| 8,670,882 B2 | 3/2014 | Xie et al. | |
| 8,694,246 B2* | 4/2014 | Yamakawa | G01C 21/00 |
| | | | 701/428 |
| 8,700,251 B1* | 4/2014 | Zhu | G05D 1/02 |
| | | | 701/25 |
| 8,718,917 B2 | 5/2014 | Basnayake | |
| 8,836,537 B2* | 9/2014 | Ogura | G01C 21/3697 |
| | | | 340/905 |
| 9,476,721 B2* | 10/2016 | Ogawa | G01C 21/34 |
| 9,719,794 B2* | 8/2017 | Nakano | G06F 16/51 |
| 9,734,718 B2* | 8/2017 | Shida | G08G 1/161 |
| 10,175,055 B2* | 1/2019 | Mayrhofer | G01C 21/34 |
| 2001/0002203 A1 | 5/2001 | Chan et al. | |
| 2005/0080560 A1 | 4/2005 | Hatch | |
| 2005/0137786 A1 | 6/2005 | Breed et al. | |
| 2007/0069874 A1 | 3/2007 | Huang et al. | |
| 2007/0225912 A1 | 9/2007 | Grush | |
| 2008/0208460 A1 | 8/2008 | Nakao et al. | |
| 2010/0125414 A1 | 5/2010 | Okuyama et al. | |
| 2010/0228420 A1* | 9/2010 | Lee | B62D 1/28 |
| | | | 701/26 |
| 2010/0295726 A1 | 11/2010 | Tann | |
| 2010/0332127 A1 | 12/2010 | Imai et al. | |
| 2011/0169958 A1* | 7/2011 | Imai | B60W 30/12 |
| | | | 348/149 |
| 2011/0320163 A1* | 12/2011 | Markkula | B60W 40/072 |
| | | | 702/150 |
| 2012/0004845 A1 | 1/2012 | Kmiecik et al. | |
| 2012/0296539 A1* | 11/2012 | Cooprider | B60W 10/06 |
| | | | 701/70 |
| 2013/0082874 A1 | 4/2013 | Zhang | |
| 2013/0184926 A1 | 7/2013 | Spero et al. | |
| 2013/0211656 A1* | 8/2013 | An | G05D 1/0221 |
| | | | 701/25 |
| 2013/0231825 A1* | 9/2013 | Chundrlik, Jr. | B60W 50/0098 |
| | | | 701/29.1 |
| 2014/0049646 A1* | 2/2014 | Nix | B60R 1/002 |
| | | | 348/148 |
| 2014/0229068 A1 | 8/2014 | Ueyama et al. | |
| 2015/0134243 A1* | 5/2015 | Reynolds | G07C 5/008 |
| | | | 701/468 |
| 2015/0149073 A1 | 5/2015 | Ishigami et al. | |
| 2015/0331422 A1* | 11/2015 | Hartung | G05D 1/021 |
| | | | 701/23 |
| 2016/0221575 A1* | 8/2016 | Posch | B60W 50/0098 |
| 2016/0258764 A1* | 9/2016 | Phuyal | G01C 21/26 |
| 2016/0332535 A1* | 11/2016 | Bradley | B60N 2/002 |
| 2017/0131719 A1* | 5/2017 | Micks | B60W 40/08 |
| 2018/0165525 A1* | 6/2018 | Hamada | G01C 21/30 |
| 2018/0322776 A1* | 11/2018 | Bararsani | G08G 1/0112 |
| 2018/0328742 A1* | 11/2018 | Asai | G01C 21/30 |

FOREIGN PATENT DOCUMENTS

| | | | |
|---|---|---|---|
| JP | 2017016226 A | * 1/2017 | G08G 1/16 |
| KR | 20120081771 | 7/2012 | |
| KR | 101339255 | 12/2013 | |
| WO | 2015049044 | 4/2015 | |

OTHER PUBLICATIONS

Yu-Kumg et al., "GPS Correction with the Sky-Subimage Recognition," Year: 2012, pp. 365-370.*

* cited by examiner

MULTIPATH ERROR CORRECTION

BACKGROUND

Different types of global positioning system (GPS) technologies exist. For example, a differential global positioning system (DGPS) provides enhanced location accuracy by using a network of ground based reference stations to broadcast the difference between positions indicated by GPS satellites and the known fixed positions of the ground based reference stations. However, these systems may be affected by multipath errors, which are errors caused when a satellite signal reaches the receiver from two or more paths (e.g., one directly from the satellite and the others reflected from nearby buildings or other surfaces).

BRIEF DESCRIPTION

According to one or more aspects, a system for multipath error correction is provided. The system may include a global positioning system (GPS) component determining a first GPS position of a vehicle at a first time and a second GPS position for the vehicle at a second time, an image capture component monitoring for a change of lane associated with the vehicle between determination of the first GPS position and the second GPS position for the vehicle, and an error correction component calculating an updated position for the vehicle by using the change of lane information to confirm or correct the second GPS position of the vehicle.

The GPS component may determine one or more positions of the vehicle at a lane level. The image capture component may determine one or more positions of the vehicle at a lane level. The system may include a lane keep assist system (LKAS) component setting a lane continuation flag based on the change of lane information. The error correction component may calculate the updated position for the vehicle based on a value of the lane continuation flag. The error correction component may check a validity of data provided by the LKAS component. The error correction component may calculate the updated position for the vehicle based on the validity of the data provided by the LKAS component. The error correction component may determine the updated position for the vehicle as a last known lane based on the lane continuation flag being indicative of the vehicle maintaining lane position between the first time and the second time.

The error correction component may compare the second GPS position for the vehicle with the change of lane information. The error correction component may calculate the updated position for the vehicle based on the comparison. The error correction component may calculate the updated position for the vehicle based on a comparison distance threshold.

According to one or more aspects, a method for multipath error correction may include determining a first GPS position of a vehicle, determining a second GPS position for the vehicle, monitoring, using image capture sensors, for a change of lane associated with the vehicle between determination of the first GPS position and the second GPS position for the vehicle, and calculating an updated position for the vehicle by using the change of lane information to confirm or correct the second GPS position of the vehicle.

The first GPS position and the second GPS position may be associated with lane level information. The change of lane information may be associated with lane level information. The method may include setting a lane continuation flag based on the change of lane information, calculating the updated position for the vehicle based on a value of the lane continuation flag, or comparing the second GPS position for the vehicle with the change of lane information. Calculating the updated position for the vehicle may be based on the comparison. Calculating the updated position for the vehicle may be based on a comparison distance threshold.

According to one or more aspects, a system for multipath error correction may include a global positioning system (GPS) component determining a first GPS position of a vehicle and a second GPS position for the vehicle, the second GPS position for the vehicle maybe associated with an unknown lane, an image capture component monitoring for a change of lane associated with the vehicle between determination of the first GPS position and the second GPS position for the vehicle, and an error correction component calculating an updated position for the vehicle by using the change of lane information to update the second GPS position of the vehicle.

DETAILED DESCRIPTION

Figure 1:
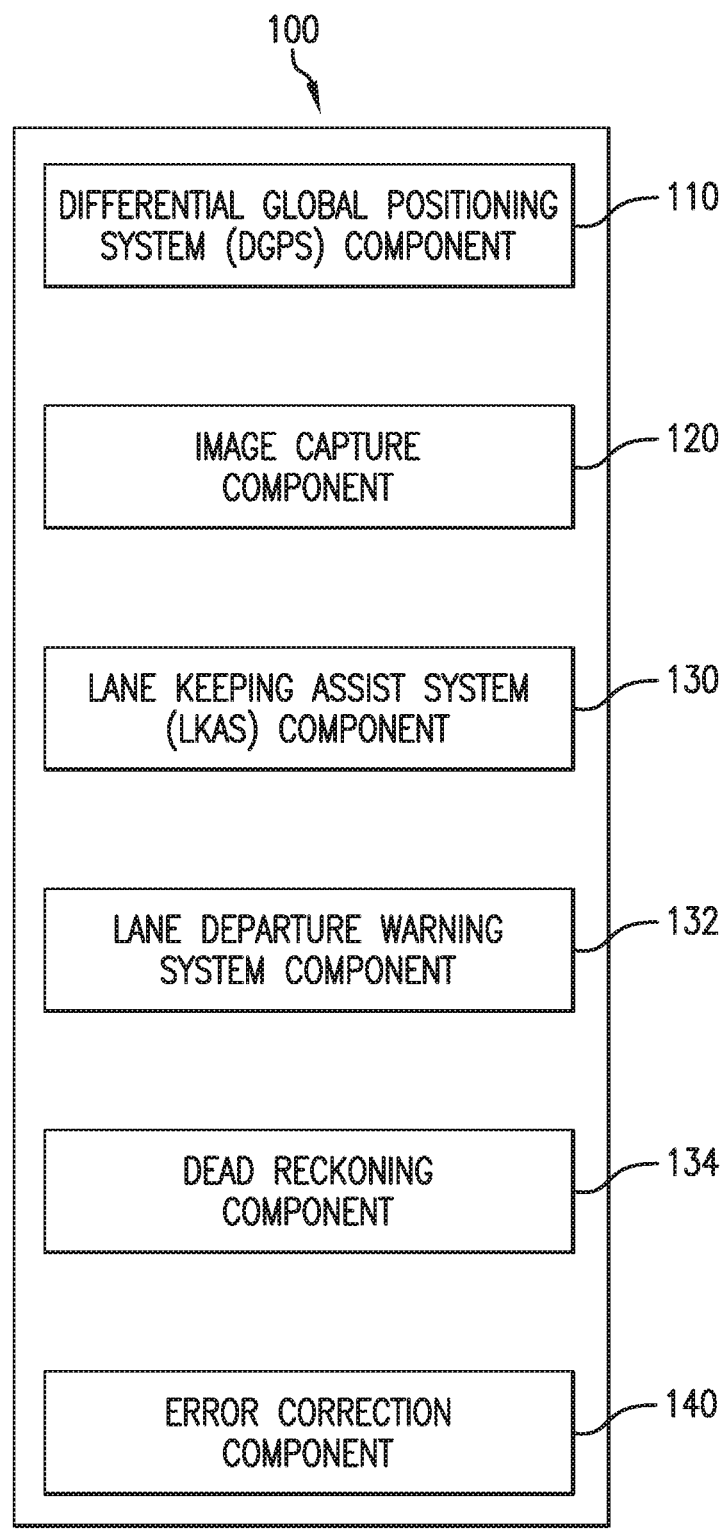
FIG. 1 is an illustration of an example component diagram of a system for multipath error correction, according to one or more embodiments.

FIG. 1 is an illustration of an example component diagram of a system 100 for multipath error correction, according to one or more embodiments. The system 100 for multipath error correction may include a global positioning system (GPS) or GPS component 110, an image capture component 120, a lane keeping assist system (LKAS) or LKAS component 130, a lane departure warning system (LDW) or LDW component 132, a dead reckoning component 134, and an error correction component 140. The system 100 for multipath error correction may provide the GPS component 110 with enhanced position correcting capabilities by using image capture or LKAS technology to determine whether a vehicle has changed lanes and in some embodiments, calculate positioning of the vehicle in parallel with the GPS component 110.

For example, using data or information collected by the image capture component 120 or the LKAS component 130, the error correction component 140 may correct GPS signals associated with the vehicle which erroneously or incorrectly register the location of the vehicle along a different path or different lanes due to multipath errors (e.g., associated with entering a tunnel, etc.). Further, if it is determined that the vehicle has changed lanes, the error correction component 140 may confirm the change of lane or location accordingly.

The GPS component 110 may determine one or more GPS positions associated with a vehicle at one or more times or time intervals (e.g., one second time intervals), such as a first GPS position of a vehicle at a first time, a second GPS position for the vehicle at a second time, etc. The GPS component 110 may be a differential GPS type of system which communicates with one or more ground reference stations or one or more GPS satellites to determine one or more of the positions of the vehicle. Due to the enhanced accuracy of some types of GPS, lane level information may be known. In other words, the GPS component 110 may determine one or more positions of the vehicle at a lane level such that GPS positions are associated with lane level information (e.g., the vehicle is travelling in a particular lane).

Further, the GPS component 110 may supplement this lane level information with map information from a map database. For example, the information from a map database may indicate that there are a number of lanes (e.g., three lanes) on a roadway on which a vehicle is travelling. Because the GPS component 110 provides positions or locations at a lane level, this enables the GPS component 110 to generally determine a position of a vehicle within lanes of a roadway. However, in some scenarios, such as when a GPS signal is lost or when a vehicle enters a tunnel, multipath errors may be introduced, resulting in an erroneous GPS position or an unknown GPS position.

In one or more embodiments, the image capture component 120 may capture one or more images of a roadway for a vehicle during travel, and monitor for a change of lane associated with the vehicle. Here, the image capture component 120 may analyze one or more of the captured images for one or more lane markings and determine whether a vehicle has changed lanes based on positions of one or more of the lane markings within a series of captured images. This change of lane information may be cross referenced with the GPS positions determined by the GPS component 110.

For example, if a vehicle is travelling along a roadway having three lanes on a straight road segment, change of lane information may be acquired by the image capture component 120 or one or more image capture sensors. This change of lane information may include a number of lanes, a position of the vehicle within the number of lanes, etc. If the vehicle is travelling in the middle lane of the three lanes, and does not change lanes, the change of lane information determined by the image capture component 120 will be indicative that the vehicle is in the middle lane.

If the GPS component 110 returns or provides a location of a vehicle in either the right or left lane of the three lanes, the error correction component 140 may determine an updated position for the vehicle based on the change of lane information from the image capture component 120. Here, in this example, because the image capture component 120 has determined that the vehicle is in the center lane of the three lanes, and that the vehicle has not changed lanes or has otherwise maintained its present lane, the error correction component 140 may update the position of the vehicle to correspond to the position having coordinates associated with the center lane.

Regardless, the image capture component 120 may determine a number of lanes within a roadway, a location of the vehicle within the number of lanes (e.g., which lane the vehicle is presently travelling in), a lane level position of a vehicle, whether the vehicle is changing or has changed lanes, change of lane information associated with a vehicle, etc. Further, images captured by the image capture component 120 may be utilized to determine a position of a vehicle at a lane level.

In one or more embodiments, the error correction component 140 may calculate an updated position for a vehicle based on change of lane information from the image capture component 120. In other words, the image capture component 120 is not necessarily required to calculate a position for a vehicle in order for the system 100 for multipath error correction to be operational. As discussed in the example above, change of lane information may be utilized to update, confirm, or correct a GPS position of a vehicle. In other words, if a vehicle has not changed lanes, the GPS position of the vehicle should not be indicative of a change of lane.

Accordingly, if the GPS component 110 provides a GPS position indicative of a change of lane, while the image capture component 120 has not observed a change of lane, the error correction component 140 may update or correct one or more coordinates of the GPS position of the vehicle accordingly. In this way, the error correction component 140 may compare or cross reference a GPS position for a vehicle with change of lane information to verify that at least the lane portion of the GPS coordinates are correct.

In one or more embodiments, the LKAS component 130 may set a lane continuation flag based on the change of lane information gathered by the image capture component 120. In other words, the LKAS component 130 may generate a value for the lane continuation flag, such as the flag=1 when it is detected that the vehicle is not changing lanes or is otherwise maintaining its present lane. Conversely, the LKAS component 130 may set the lane continuation flag=0 when the images analyzed by the image capture component 120 are indicative of a lane change, such as when positions of lane markers drift within a series of captured images or when borders, such as grass or other identifiers shift by a threshold amount within captured images.

The LDW component 132 may implement the image capture component 120 to determine or monitor whether a vehicle has changed lanes. Here, the LDW component 132 may set a lane continuation flag based on the change of lane information gathered by the image capture component 120 in a similar fashion as the LKAS component 130.

The dead reckoning component 134 may receive yaw data or speed data associated with a vehicle and determine a relative position of a vehicle or change of lane information associated with a vehicle. For example, if the yaw of the vehicle is changed from a first yaw rate to a second yaw rate (e.g., and the change is greater than a threshold yaw amount) while the speed of the vehicle is greater than a threshold speed and map information provided by the GPS component 110 indicates that a roadway on which the vehicle is travelling is a straight road segment, the dead reckoning component 134 may determine that the vehicle has changed lanes. Thus, in one or more embodiments, the dead reckoning component 134 may set a lane continuation flag or determine change of lane information based on yaw data and speed information received.

In this way, the LDW component 132 or the dead reckoning component 134 may be utilized by the system 100 for multipath error correction as an alternative or as a check against the change of lane information provided by the LKAS component 130. Thus, in one or more embodiments, aspects of the system 100 for multipath error correction described with respect to the LKAS component 130 may be substituted or enhanced with data from the LDW component 132 or the dead reckoning component 134.

Thus, the error correction component 140 may thus calculate an updated position for the vehicle based on the value of the lane continuation flag. In other words, if the lane continuation flag is indicative of a lane change, the error correction component 140 may check the GPS position to ensure that a lane change is reflected. Similarly, if the lane continuation flag is indicative of no lane change, the error correction component 140 may ensure that the GPS position corresponds to no lane change. Updates and confirmations to GPS positions provided by the GPS component 110 may thus be made by the error correction component 140 in this way.

For example, if no lane change is detected by the image capture component 120, the LKAS component 130 may setup the lane continuation flag to be on, have a value of one, or be indicative of no lane change. The error correction component 140 may compare the GPS position of the vehicle (e.g., provided by the GPS component 110) against a GPS position associated with no lane change based on the value of the lane continuation flag and update or confirm the GPS position accordingly. Thus, the error correction component 140 may determine an updated position for a vehicle as a last known lane based on the lane continuation flag being indicative of the vehicle maintaining a lane position between a first time and a second time.

In one or more embodiments, the LKAS component 130 may determine or calculate one or more positions of a vehicle at a lane level using an initial GPS position (e.g., which may be verified by ground truth or by the image capture component 120) and data captured by the image capture component 120. Here, the error correction component 140 may compare a received GPS position against a position calculated by the LKAS component 130. If a different between the GPS position and the position calculated by the LKAS component 130 is greater than a comparison distance threshold, the error correction component 140 may adjust or update the GPS position in one or more scenarios (e.g., based on the comparison, a comparison distance threshold (e.g., 125 cm, 80 cm, etc.), a validity of data associated with the LKAS component 130, based on a GPS position for the vehicle being associated with an unknown lane, etc.).

The validity of data associated with the LKAS component 130 may be determined using information from other components, such as the LDW component 132 or the dead reckoning component 134. In other words, if the LKAS component 130 determines that a lane change has occurred, while the dead reckoning component 134 determines that no lane change has occurred (e.g., the positioning of the vehicle has not changed relative to a contour of a lane, given yaw information or speed information associated with a vehicle), the error correction component 140 may utilize a last known lane associated with a vehicle as a position for the vehicle.

For example, if a comparison between a GPS position and a position calculated by the LKAS component 130 indicates that a difference greater than a comparison distance threshold exists, a value of a lane continuation flag may be examined to determine whether the vehicle changed lanes. If the lane continuation flag is on, set to one, or indicative of no lane change, the GPS position may be updated by the error correction component to be associated with the last known lane, since no lane change has occurred. If the lane continuation flag is off, set to zero, or indicative of one or more lane changes, the GPS position may be updated by the error correction component to be associated with a lane associated with a lane change indicated by the LKAS component 130. In other embodiments, the GPS position may be set to unknown if no LKAS position is calculated by the LKAS component 130.

In this way, the error correction component 140 may correct discrepancies in positions provided by the GPS component 110 and the image capture component 120 or the LKAS component 130. For example, as a result of a vehicle entering a tunnel, multipath errors may be created or introduced. Thus, the system 100 for multipath error correction may use data from the image capture component 120 or the LKAS component 130 to remove or compensate for errors associated with false readings from a GPS unit or GPS component 110. Because the image capture component 120 or the LKAS component 130 determine whether a vehicle has changed lanes using real time image data captured, and not by comparing the image data to image data from a database, less processing time and computing resources are generally required, thereby enabling multipath errors to be quickly and efficiently corrected.

Figure 2:
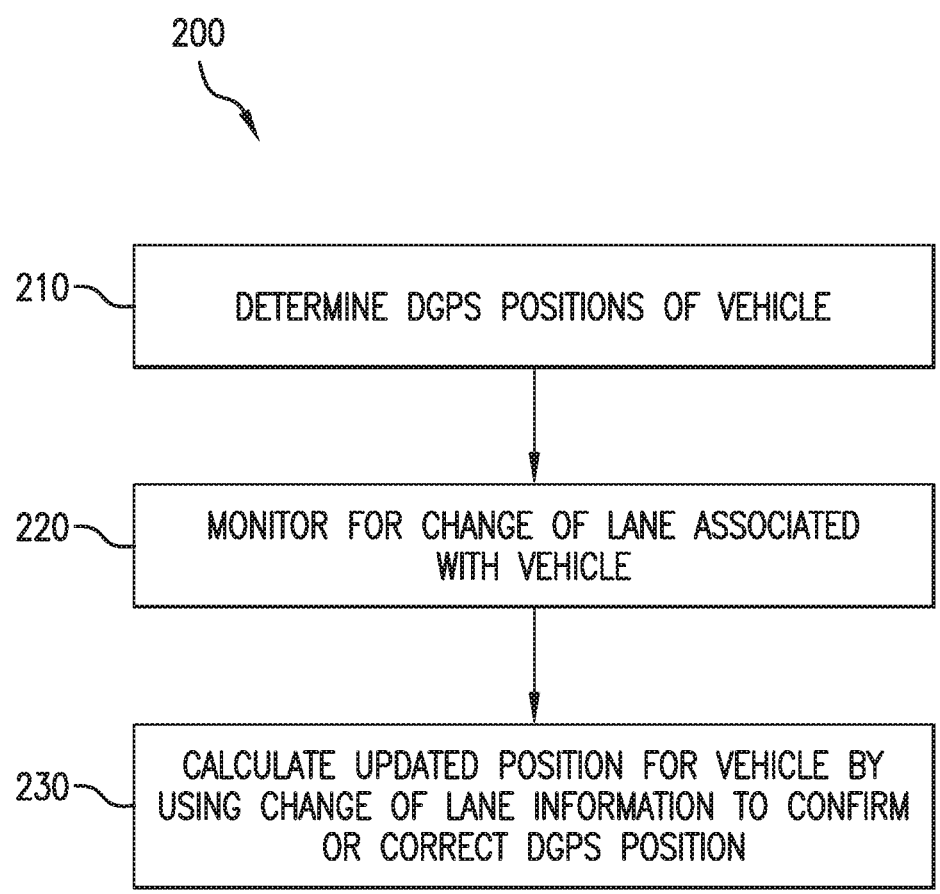
FIG. 2 is an illustration of an example flow diagram of a method for multipath error correction, according to one or more embodiments.

FIG. 2 is an illustration of an example flow diagram of a method 200 for multipath error correction, according to one or more embodiments. The method 200 may include determining one or more GPS positions associated with a vehicle 210, monitoring 220 for a change of lane associated with the vehicle, and 230 calculating or compensating for multipath error correction or otherwise updating the position for the vehicle by using change of lane information to confirm or correct a GPS position.

Figure 3:
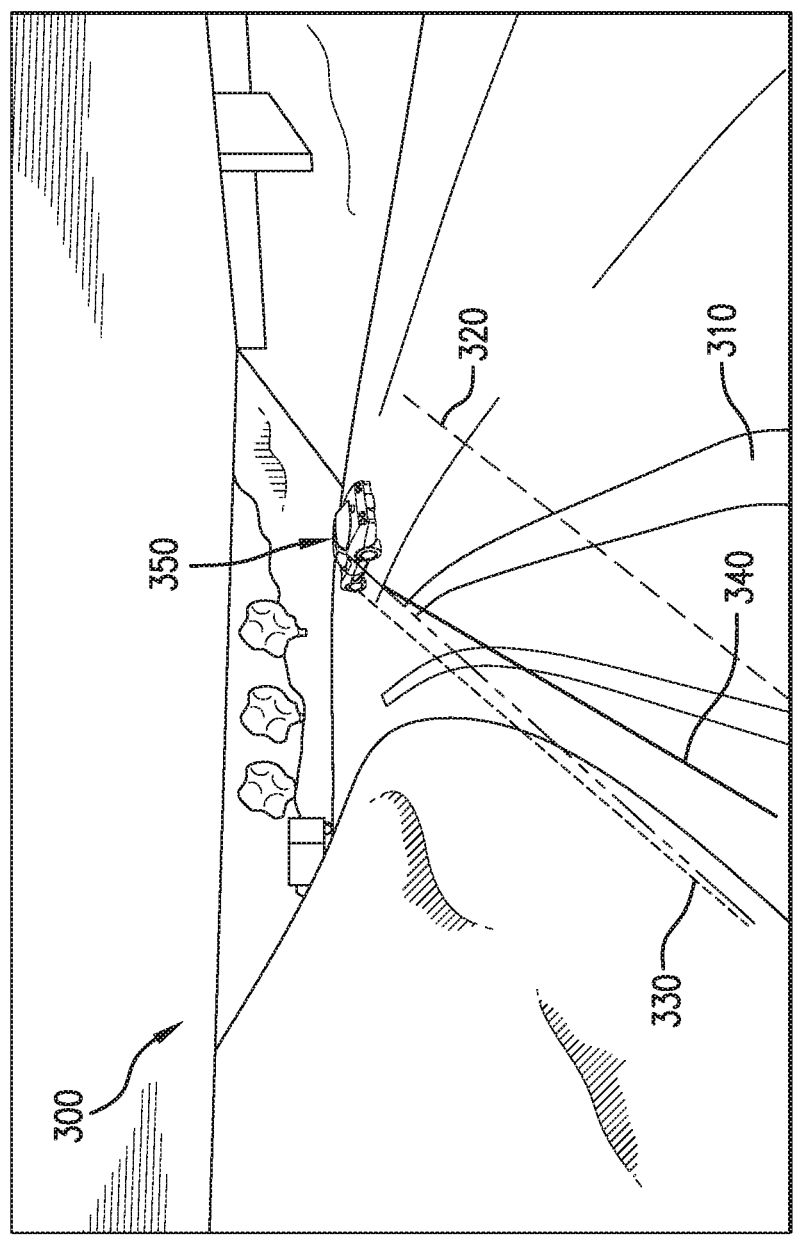
FIG. 3 is an illustration of an example scenario where multipath error correction may be implemented, according to one or more embodiments.

FIG. 3 is an illustration of an example scenario 300 where multipath error correction may be implemented, according to one or more embodiments. As seen in FIG. 3 below, a vehicle 350 may be equipped with a GPS unit, such as the GPS component 110 from the system 100 for multipath error correction of FIG. 1. Multipath signals 320, 330, and 340 associated with the GPS component 110 may be erroneously indicative that the vehicle 350 is travelling across three different lanes, while path 310 represents the path actually traveled by the vehicle 350. It can be seen that the path of the vehicle 350 begins in a first lane and ends in a lane to the right of the first lane.

In this scenario, an error correction component, such as the error correction component 140 of FIG. 1 may use images or data from the image capture component 120 or the LKAS component 130 as a double check or as a cross reference against the positional data of the GPS component 110. Based on this comparison, the position of the vehicle 350 may be updated accordingly.

Figure 4:
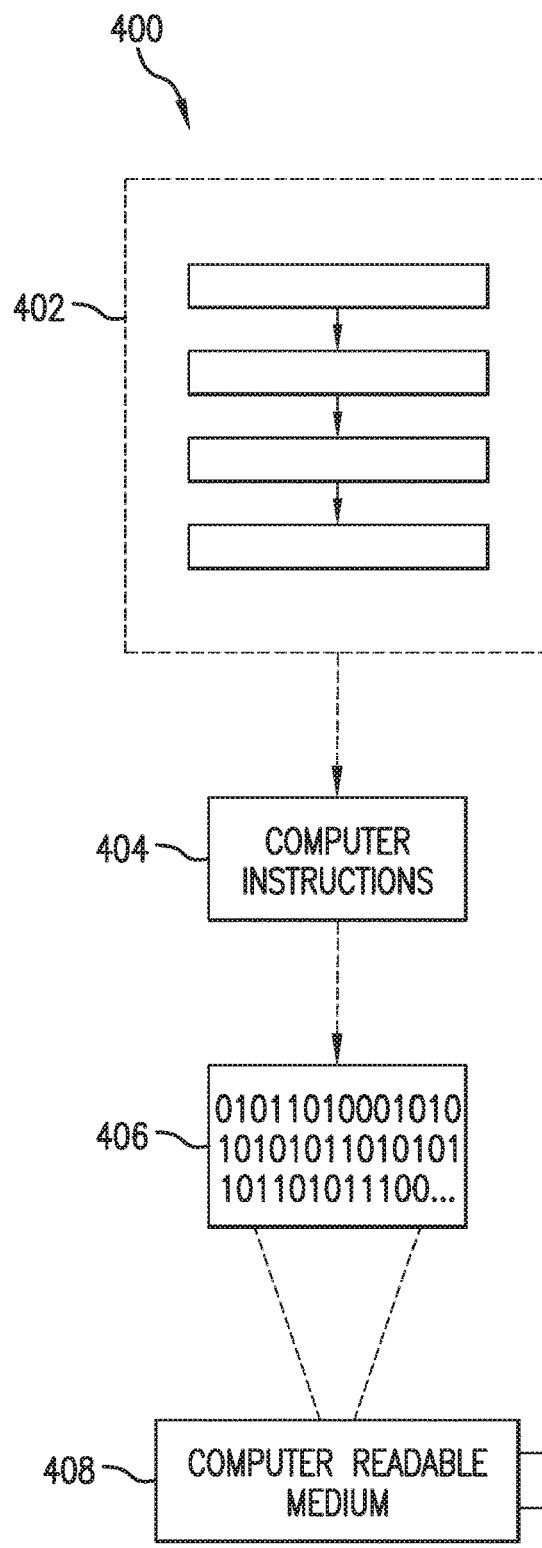
FIG. 4 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This computer-readable data 406, such as binary data including a plurality of zero's and one's as shown in 406, in turn includes a set of computer instructions 404 configured to operate according to one or more of the principles set forth herein. In one such embodiment 400, the processor-executable computer instructions 404 may be configured to perform a method 402, such as the method 200 of FIG. 2. In another embodiment, the processor-executable instructions 404 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
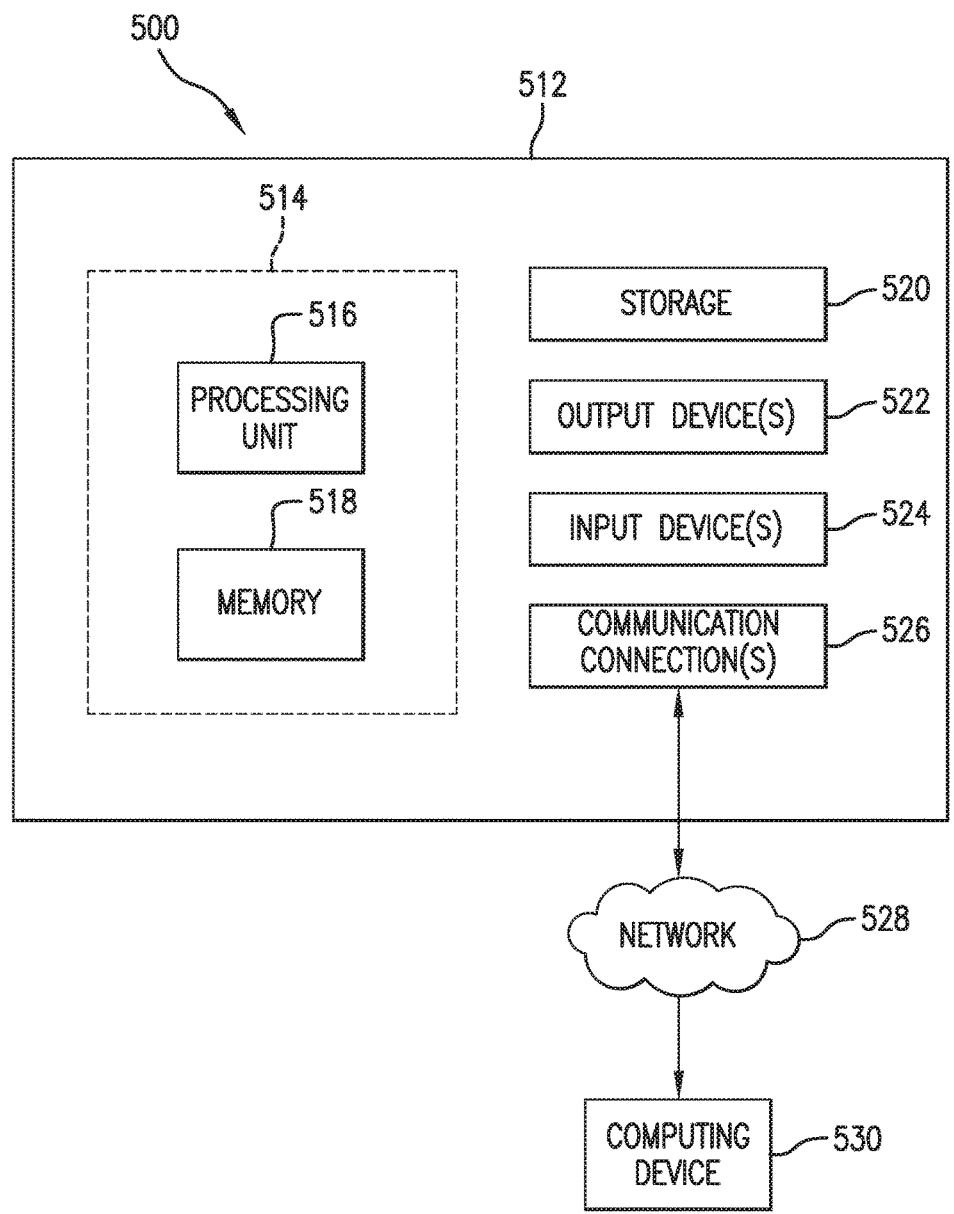
FIG. 5 is an illustration of an example computing environment where one or more of the provisions set forth herein are implemented, according to one or more embodiments.

FIG. 5 and the following discussion provide a description of a suitable computing environment to implement embodiments of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one or more embodiments provided herein. In one configuration, computing device 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other embodiments, computing device 512 includes additional features or functionality. For example, computing device 512 may include additional storage such as removable storage or non-removable storage, including, but not limited to, magnetic storage, optical storage, etc. Such additional storage is illustrated in FIG. 5 by storage 520. In one or more embodiments, computer readable instructions to implement one or more embodiments provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 512. Any such computer storage media is part of device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 512 includes input device(s) 524 such as keyboard, mouse, pen, voice input device, touch input device, infrared cameras, video input devices, or any other input device. Output device(s) 522 such as one or more displays, speakers, printers, or any other output device may be included with device 512. Input device(s) 524 and output device(s) 522 may be connected to device 512 via a wired connection, wireless connection, or any combination thereof. In one or more embodiments, an input device or an output device from another computing device may be used as input device(s) 524 or output device(s) 522 for computing device 512. Device 512 may include communication connection(s) 526 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for multipath error correction, comprising:
    a global positioning system (GPS) component determining a first GPS position of a vehicle at a first time and a second GPS position for the vehicle at a second time;
    an image capture component monitoring for a change of lane associated with the vehicle between determination of the first GPS position and the second GPS position for the vehicle; and
    an error correction component calculating an updated position for the vehicle by performing a comparison between the change of lane information and the second GPS position of the vehicle and setting the updated position for the vehicle as the second GPS position.

2. The system for multipath error correction of claim 1, wherein the GPS component determines one or more positions of the vehicle at a lane level.

3. The system for multipath error correction of claim 1, wherein the image capture component determines one or more positions of the vehicle at a lane level.

4. The system for multipath error correction of claim 1, comprising a lane keep assist system (LKAS) component setting a lane continuation flag based on the change of lane information.

5. The system for multipath error correction of claim 4, wherein the error correction component calculates the updated position for the vehicle based on a value of the lane continuation flag.

6. The system for multipath error correction of claim 4, wherein the error correction component checks a validity of data provided by the LKAS component.

7. The system for multipath error correction of claim 6, wherein the error correction component calculates the updated position for the vehicle based on the validity of the data provided by the LKAS component.

8. The system for multipath error correction of claim 7, wherein the error correction component determines the updated position for the vehicle is a last known lane based on the lane continuation flag being indicative of the vehicle maintaining lane position between the first time and the second time.

9. The system for multipath error correction of claim 1, comprising a lane departure warning (LDW) component determining whether the vehicle has changed lanes based on the change of lane information.

10. The system for multipath error correction of claim 1, wherein the error correction component calculates the updated position for the vehicle based on the comparison.

11. The system for multipath error correction of claim 10, wherein the error correction component calculates the updated position for the vehicle based on a comparison distance threshold.

12. A method for multipath error correction, comprising:
    determining a first GPS position of a vehicle;
    determining a second GPS position for the vehicle;
    monitoring, using image capture sensors, for a change of lane associated with the vehicle between determination of the first GPS position and the second GPS position for the vehicle;
    calculating an updated position for the vehicle by performing a comparison between the change of lane information and the second GPS position of the vehicle; and
    setting the updated position for the vehicle as the second GPS position.

13. The method for multipath error correction of claim 12, wherein the first GPS position and the second GPS position are associated with lane level information.

14. The method for multipath error correction of claim 12, wherein the change of lane information is associated with lane level information.

15. The method for multipath error correction of claim 12, comprising setting a lane continuation flag based on the change of lane information.

16. The method for multipath error correction of claim 15, comprising calculating the updated position for the vehicle based on a value of the lane continuation flag.

17. The method for multipath error correction of claim 12, comprising determining whether the vehicle has changed lanes based on the change of lane information.

18. The method for multipath error correction of claim 11, wherein the calculating the updated position for the vehicle is based on a validity of the change of lane information.

19. The method for multipath error correction of claim 11, wherein the calculating the updated position for the vehicle is based on a comparison distance threshold.

20. A system for multipath error correction, comprising:
    a global positioning system (GPS) component determining a first GPS position of a vehicle and a second GPS position for the vehicle, wherein the second GPS position for the vehicle is associated with an unknown lane;
    an image capture component monitoring for a change of lane associated with the vehicle between determination of the first GPS position and the second GPS position for the vehicle; and
    an error correction component calculating an updated position for the vehicle by using the change of lane information to update the second GPS position of the vehicle and setting the updated position for the vehicle as the second GPS position.

* * * * *